United States Patent
Meng

(10) Patent No.: US 7,127,966 B2
(45) Date of Patent: Oct. 31, 2006

(54) AEROBAR ASSEMBLY

(76) Inventor: Horizon Garrison Peter Meng, No. 65 Crestline Dr., #4, San Francisco, CA (US) 94131

( * ) Notice: Subject to any disclaimer, the term of this patent is extended or adjusted under 35 U.S.C. 154(b) by 0 days.

(21) Appl. No.: 10/893,361

(22) Filed: Jul. 19, 2004

(65) Prior Publication Data

US 2005/0268743 A1 Dec. 8, 2005

(51) Int. Cl.
*B62K 21/12* (2006.01)

(52) U.S. Cl. .................... 74/551.8; 74/551.1

(58) Field of Classification Search .......... 74/551.8, 74/551.1; 280/288.4, 297; *B62K 21/12*
See application file for complete search history.

(56) References Cited

U.S. PATENT DOCUMENTS

| | | | |
|---|---|---|---|
| 4,750,754 A | 6/1988 | Lennon | 280/261 |
| 4,878,397 A | 11/1989 | Lennon | 74/551.1 |
| D334,164 S | 3/1993 | Klieber | D12/178 |
| 5,197,350 A | 3/1993 | Borromeo | 74/551.8 |
| 5,319,994 A | 6/1994 | Miller | 74/551.8 |
| 5,353,663 A * | 10/1994 | Samuelson | 74/551.8 |
| 6,092,438 A * | 7/2000 | Soto | 74/551.8 |
| 6,098,493 A | 8/2000 | Cortes | 74/551.8 |
| 2003/0150292 A1 | 8/2003 | Duncan | 74/551.8 |
| 2004/0060382 A1* | 4/2004 | McColligan et al. | 74/551.8 |
| 2005/0044981 A1* | 3/2005 | Huang | 74/551.8 |
| 2005/0109151 A1* | 5/2005 | Chiang et al. | 74/551.1 |

FOREIGN PATENT DOCUMENTS

FR 2 668 745 * 5/1992 ............ 74/551.8

OTHER PUBLICATIONS

Ed Pavelka, "The Man Who Started The Revolution," Web Article [www].performancebike.com —2000.

* cited by examiner

*Primary Examiner*—Vinh T. Luong
(74) *Attorney, Agent, or Firm*—Bacon & Thomas, PLLC

(57) ABSTRACT

An aerobar assembly is arranged to be mounted on the handlebar stem, rather than on the handlebars, of a bicycle. The aerobar assembly in turn supports the handlebars. By mounting the aerobar on the stem, the range of adjustability of the aerobar is greatly increased, and the handlebar is subject to less torsional forces. The aerobar assembly includes a pillar stem having one end secured to the stem and a support structure at a second end for mounting an aerobar bracket, an arm rest support, and handlebar clamps. The aerobar bracket is arranged to permit axial adjustment of aerobar position, while the arm rest support is arranged to enable lateral, horizontal pivoting, vertical swivelling, and fore-aft adjustment of arm rest position independent of aerobar position. The handlebar mount preferably uses C-clamps that can easily be substituted to accommodate different handlebar configurations.

20 Claims, 12 Drawing Sheets

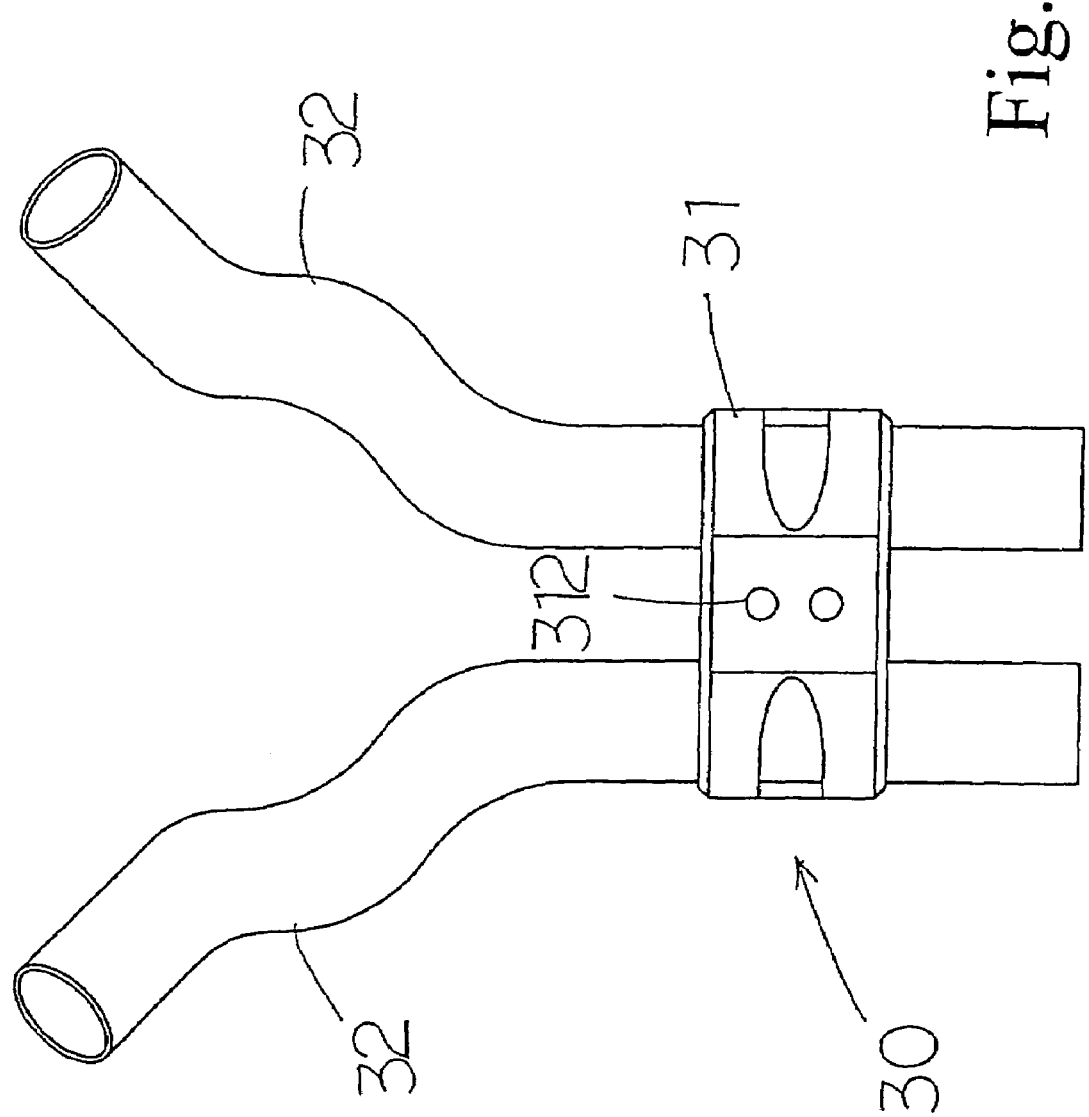

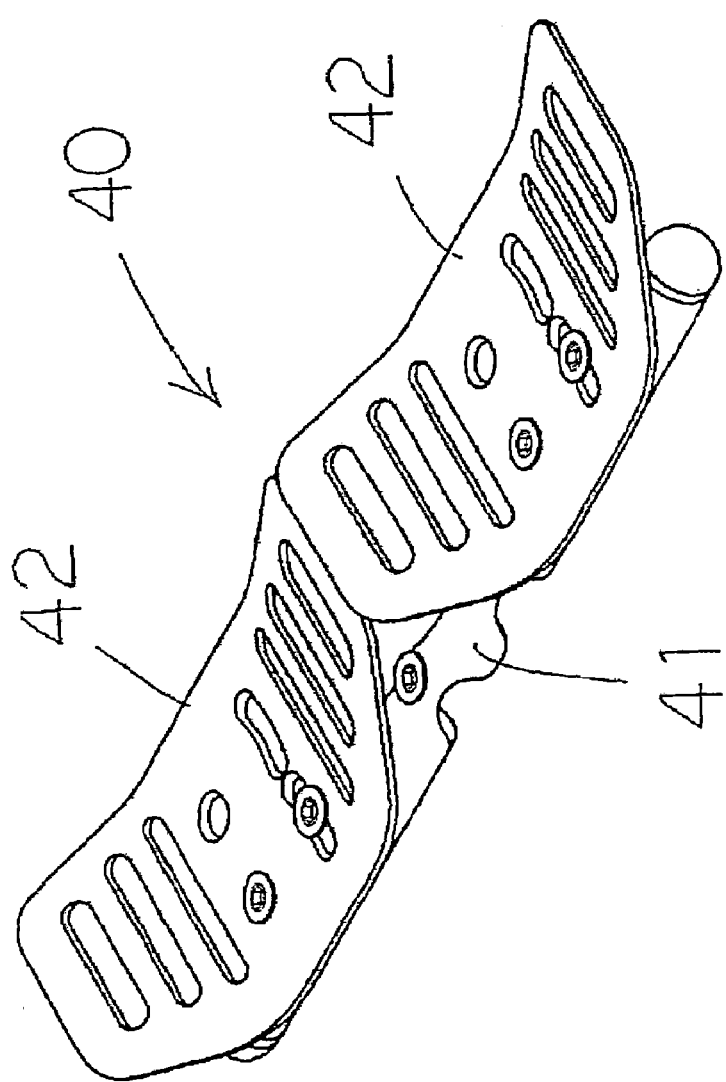

AEROBAR ASSEMBLY

BACKGROUND OF THE INVENTION

1. Field of the Invention

This invention relates to an aerodynamic handlebar extension for bicycles, also known as an "aero bar" or aerobar, and in particular to an aerobar assembly that mounts on the handlebar stem that is part of the fork of the bicycle, rather than on the existing handlebars, and that thereby provides improved adjustability, comfort, and safety.

2. Description of Related Art

The concept of handlebar extensions that permit the rider of a bicycle to assume an improved aerodynamic position, by positioning the riders hands forwardly of the handlebar and by providing support for the riders elbows or forearms, is well-known. Conceived in the mid-1980's, the aerobar was quickly adopted by triathletes. Since Greg LeMond used them in winning the 1989 Tour de France, aerobars have also attained widespread use by bicycle racers, particularly during time trials.

In competitive cycling, proper fitting or adjustment of the aerobar to the rider is critical to achieving optimal performance. In general, the closer the torso of the rider is to horizontal, the lower the aerodynamic drag on the rider. However, the resulting extension of the lower back and hamstrings in the optimal aerodynamic position may cause injury or discomfort to the rider, and may prevent the rider from achieving maximum power. In addition, proper positioning is necessary to ensure clearance for the rider's knees. As a result, the optimal position for racing or triathlons depends on the physiology of the rider, and can vary substantially from rider to rider.

Most currently available aerobars are either nonadjustable or have at best a limited adjustability. While the aerobars of an adjustable aerobar assembly can usually be moved in a fore-to-aft direction to ensure proper horizontal positioning of the rider and accommodate different arm lengths, the elbow rests or pads can only be adjusted laterally, and fail to take into account skew or angling of the rider's arm, either in a horizontal or vertical plane. Furthermore, because the conventional aerobars are either integral with the handlebars or clamped thereto, possibilities for adjustment are limited by the position and configuration of the handlebars.

On the other hand, many conventional aerobar brackets offer too great a lateral tolerance for the aerobars, because the left and right aerobar brackets are mounted independently on the handlebars. This makes it difficult to position the aerobars symmetrically, in a balanced manner, on the left and right sides of the stem.

Another problem with conventional aerobars is the problem of compatibility. Most conventional aerobars are suitable only for a single type of handlebars. Different types of handlebars, e.g., drop bars or bullhorn style TT bars, require different aerobar designs to ensure proper positioning and clamping of the aerobar, provide access to shift levers if stem mounted, and to ensure clearance between the aerobar mount and the knees of the rider.

In addition to the problems of limited adjustability and compatibility, another problem with conventional aerobars is that they can present a significant safety hazard. The cinch clamps conventionally used to secure an aerobar to the handlebars of a bicycle exert a substantial amount of force on the handlebar, in order to counter the rotational torque exerted when the rider leans on the aerobars. This anti-torsion clamping force, combined with vibrations and road shocks, can cause metal fatigue and cracking of the handlebars, while vibrations and shocks also can cause the bolts that secure the clamp to the handlebars to loosen and permit the aerobars so suddenly become loose or fall off.

Furthermore, because the conventional aerobar handlebar brackets must be positioned so that the brackets and aerobars clear the stem, they enable the aerobars to be slid to a position where they extend behind the fork, in the path of the rider's knees. This can also present a serious safety hazard.

SUMMARY OF THE INVENTION

It is accordingly a first objective of the invention to overcome the drawbacks of the prior art by providing an aerobar having enhanced performance, comfort, safety, and reliability.

It is a second objective of the invention to provide an aerobar that is fully adjustable to enable a rider to assume a position that provides optimal performance during speed racing, and that also provides an optimal balance of speed and comfort during triathlons and other endurance contests.

It is a third objective of the invention to provide an aerobar that is simple in construction and easily mounted on a bicycle.

It is a fourth objective of the invention to provide an aerobar that provides increased safety by eliminating the problems caused by the conventional use of cinch clamps to secure conventional aerobars to handlebars, including cracking of the handlebars and loosening bolts.

It is a fifth objective of the invention to provide an aerobar that can be adapted to any handlebar style, including those in which the handlebars have a non-circular cross-section.

These objectives are achieved, in accordance with the principles of a preferred embodiment of the invention, by providing an aerobar system that is arranged to be mounted on the handlebar stem of the bicycle fork, rather than on the handlebars, and that in turn supports the handlebars.

According to an especially preferred embodiment of the invention, the handlebars, aerobars, and arm rests are separately mounted to a pillar stem clamped to the handlebar stem by cap screws that thread directly into the pillar stem without the use of bolts. The bracket/support structures for the aerobars and arms rests permit a variety of independent adjustments of aerobar and arm rest position, including fore-to-aft adjustment of aerobar position, lateral and fore-to-aft adjustment of arm rest position, and adjustment of arm rest angle or skew in both horizontal and vertical planes. The handlebar mount preferably uses C-clamps that can easily be substituted to accommodate different handle bar configurations.

By mounting the aerobar on the stem, the range and ease of adjustability of the aerobars or arm rests may be greatly increased, while still ensuring that the aerobars will be laterally centered and positioned away from the riders knees. In addition, mounting of the aerobars on the handlebar stem of the bicycle fork rather than the handlebars provide a mechanical advantage that prevents torsional forces from cracking the handlebars, while the use of socket or cap screws threaded into a pillar stem to support the arm rests, aerobars, and handlebars eliminate the problem of bolt loosening.

Finally, by providing an independent modular support for the aerobars, it is possible to achieve an optimal stem length for positioning the handlebars, without or without the addition of aerobars and arm rests. The pillar stem can initially provided solely as a handlebar support, with the aerobars and arm rests offered as an option which can easily be installed, removed, replaced, and/or adjusted at a later time simply by loosening and tightening one or two screws, without such inconveniences as having to remove or re-apply handlebar tape.

BRIEF DESCRIPTION OF THE DRAWINGS

FIG. 3C is a top view of the aerobar bracket sub-assembly of FIG. 3A, with a modified aerobar configuration.

FIG. 4 is an isometric view of an arm rest sub-assembly for use in the aerobar assembly of FIG. 1.

DETAILED DESCRIPTION OF THE PREFERRED EMBODIMENTS

Figure 1A:
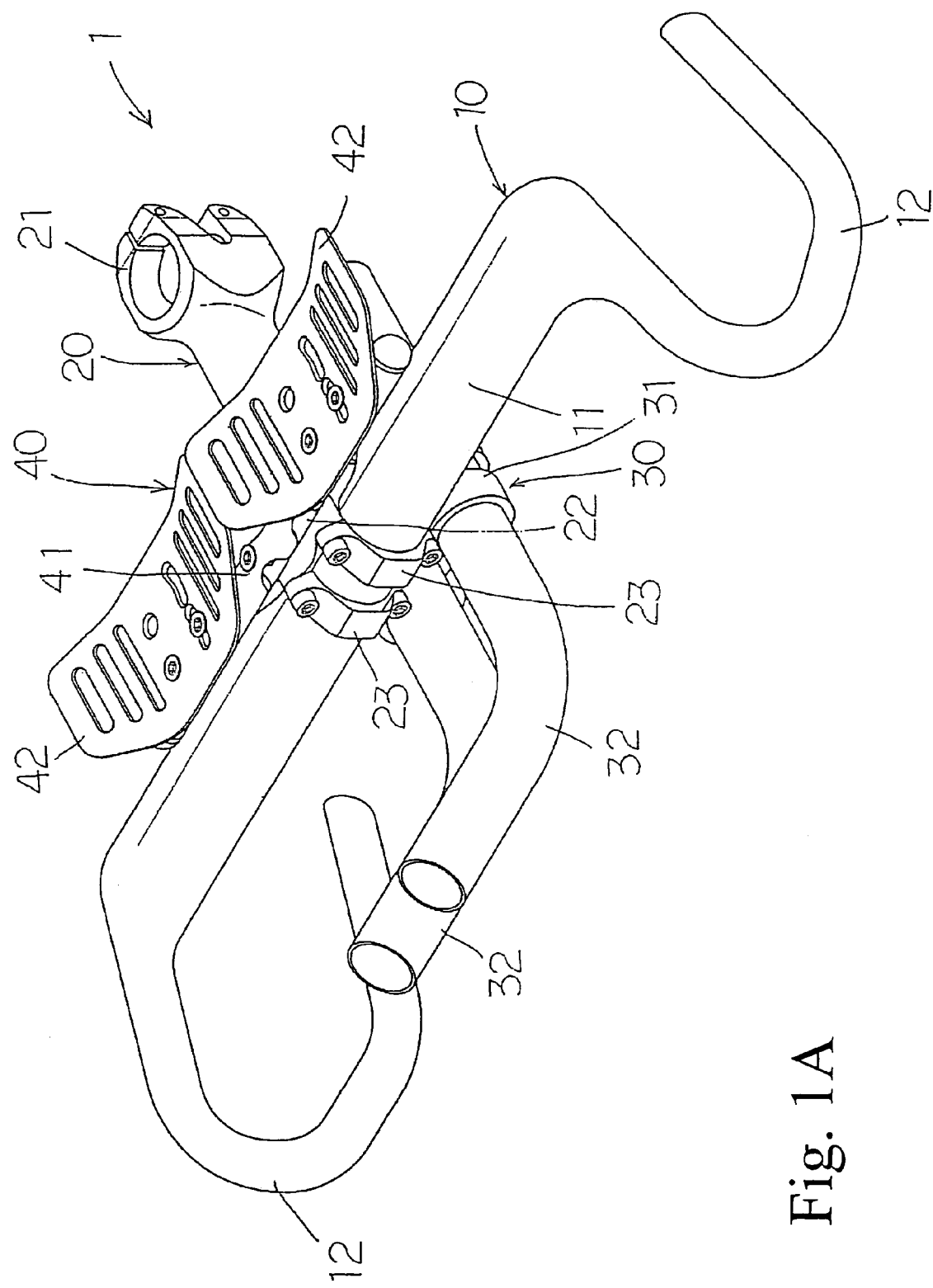
FIG. 1A is an isometric view of an aerobar assembly constructed in accordance with the principles of a preferred embodiment of the invention.
Figure 1B:
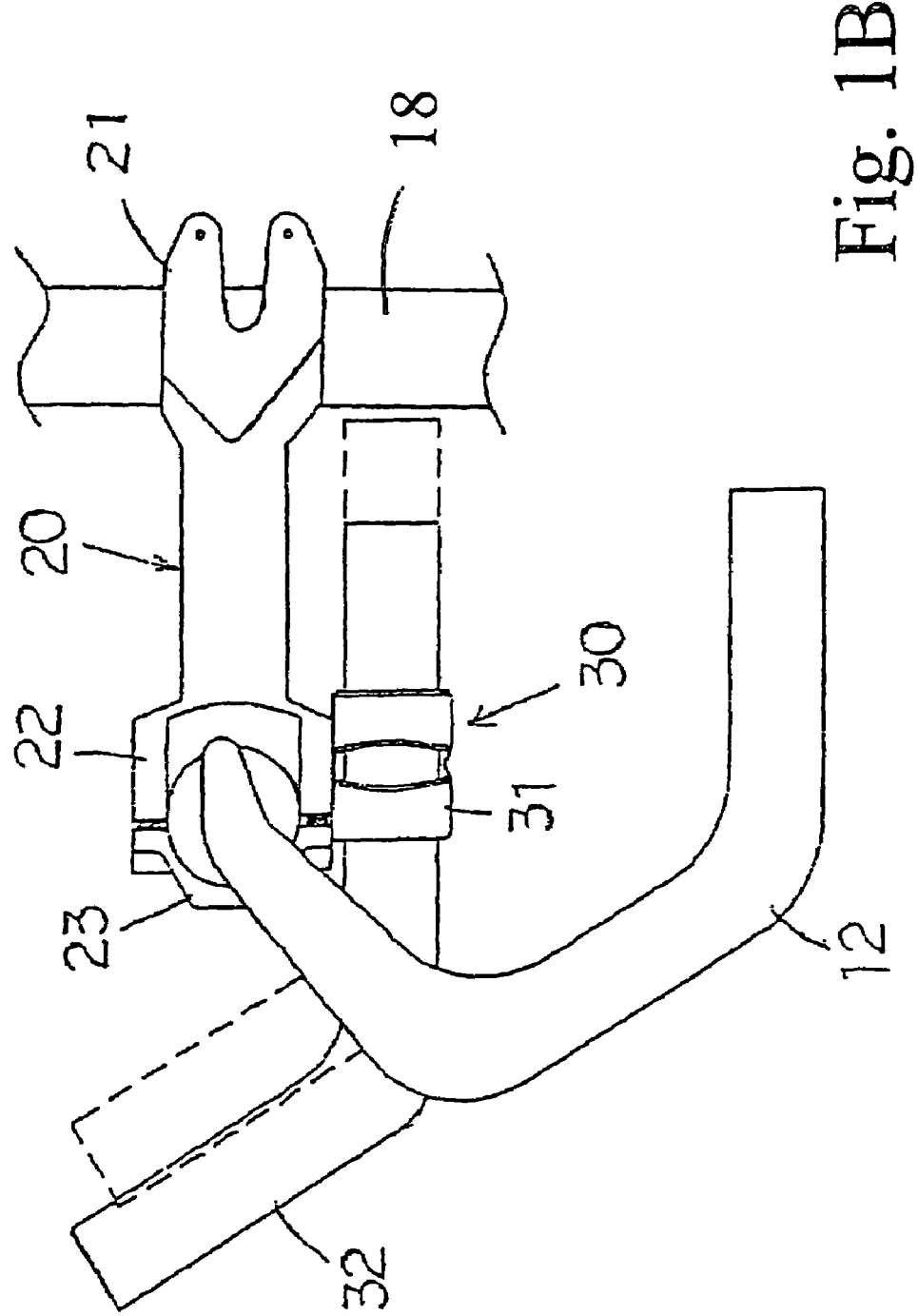
FIG. 1B is a side view of the aerobar assembly of FIG. 1.
Figure 2:
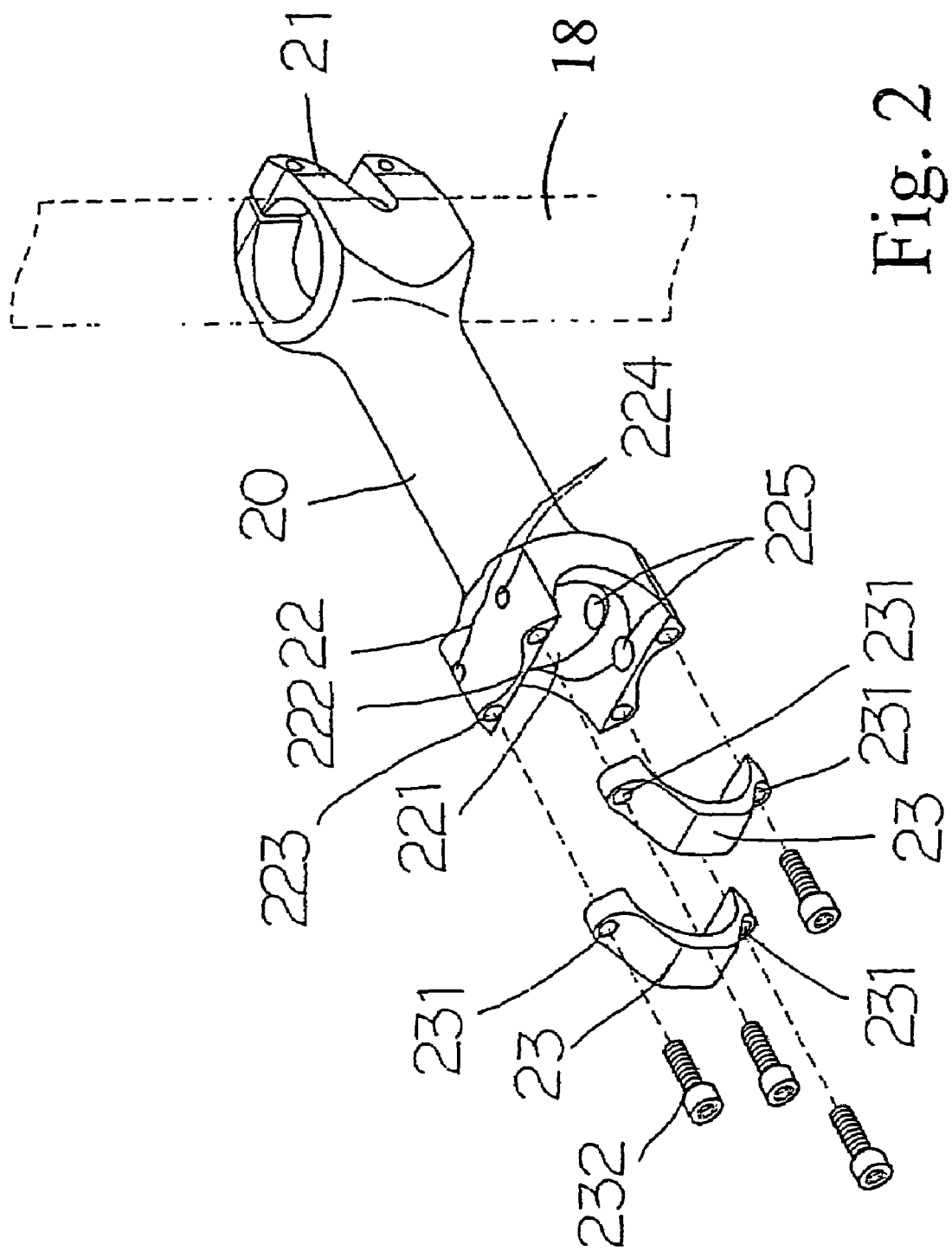
FIG. 2 is an exploded isometric view of a pillar stem for use in the aerobar assembly of FIG. 1.
Figure 3A:
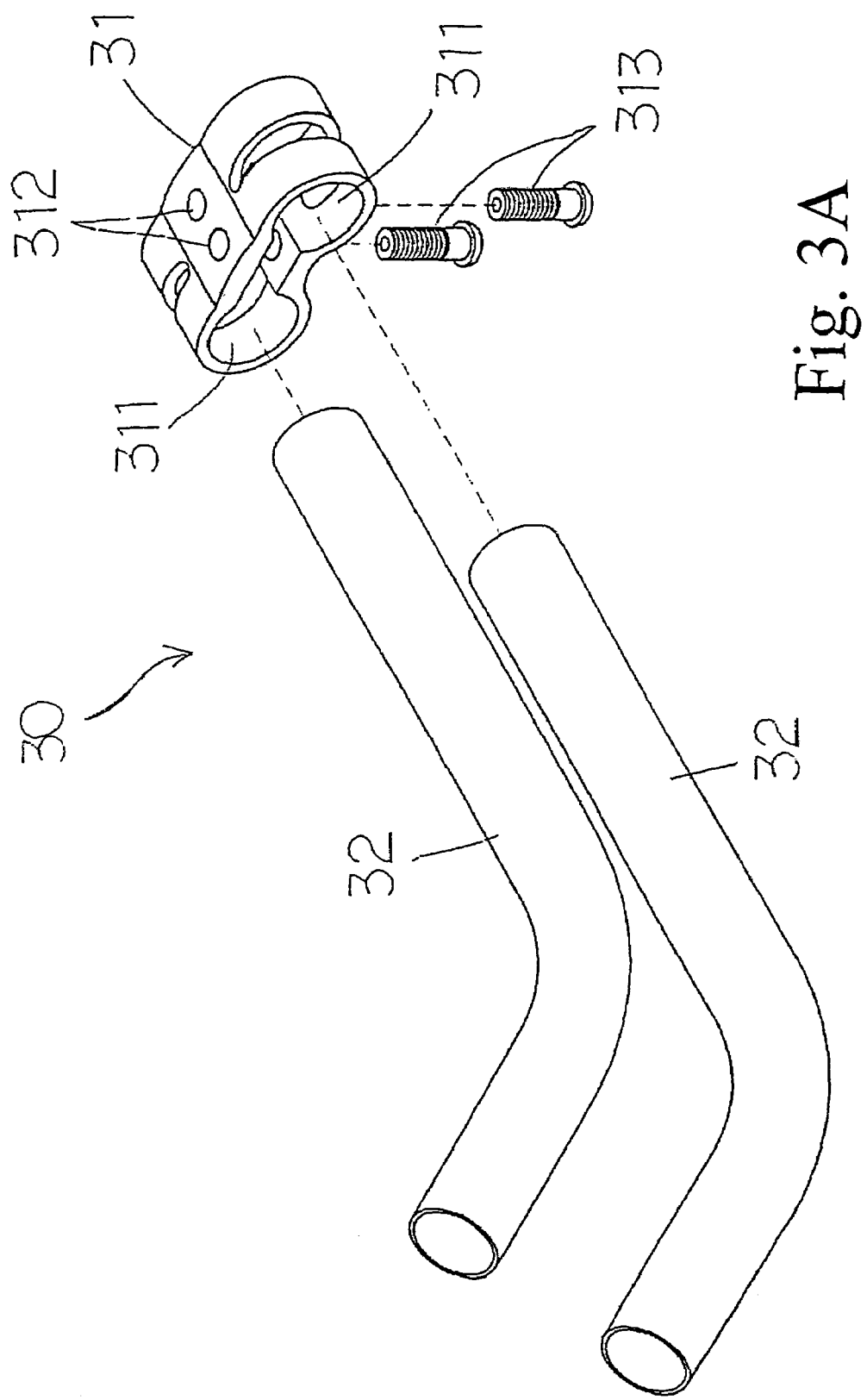
FIG. 3A is an exploded isometric view of an aerobar bracket sub-assembly for use in the aerobar assembly of FIG. 1.
Figure 3B:
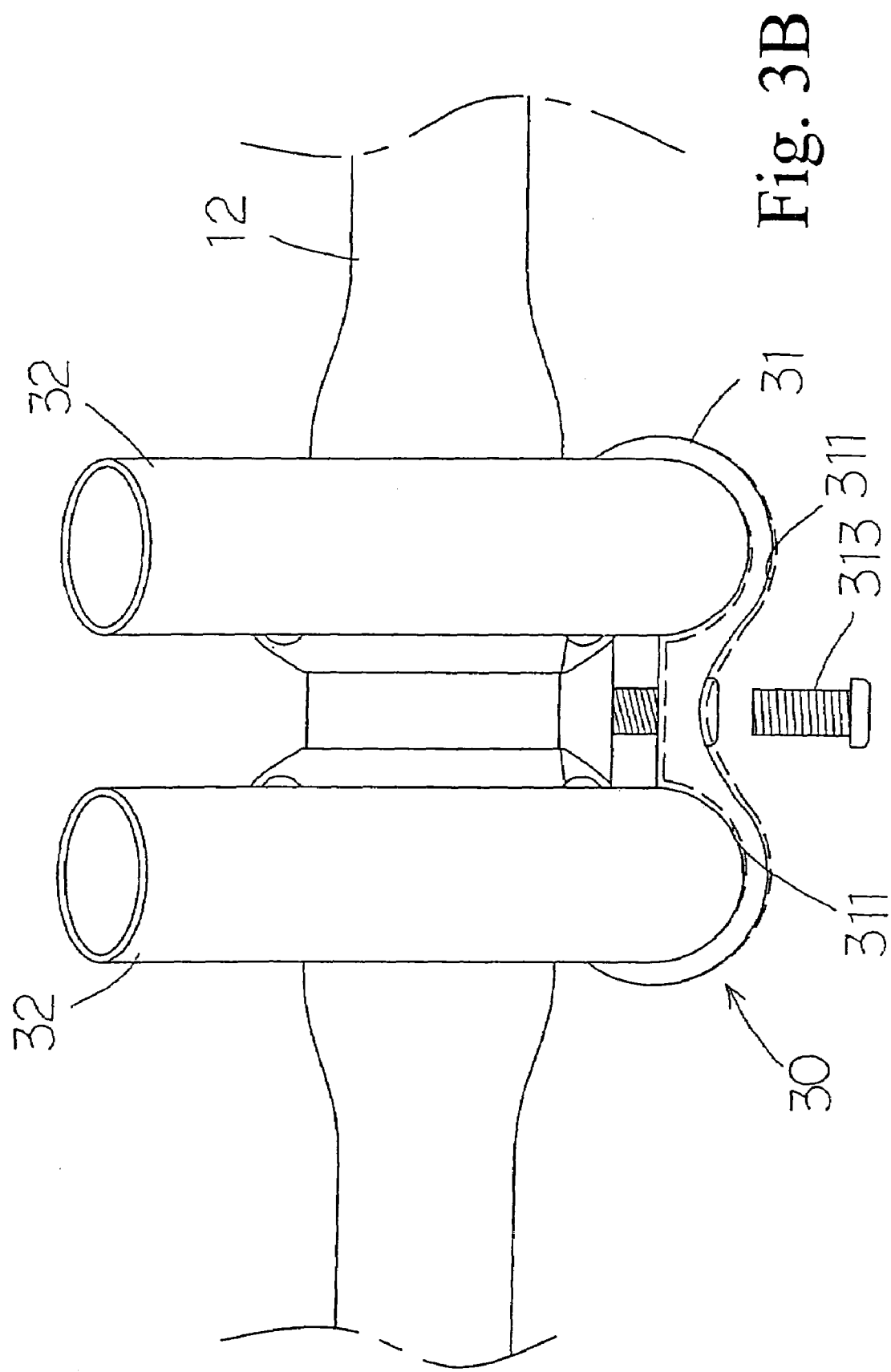
FIG. 3B is a front view of the aerobar bracket sub-assembly of FIG. 3A.
Figure 5A:
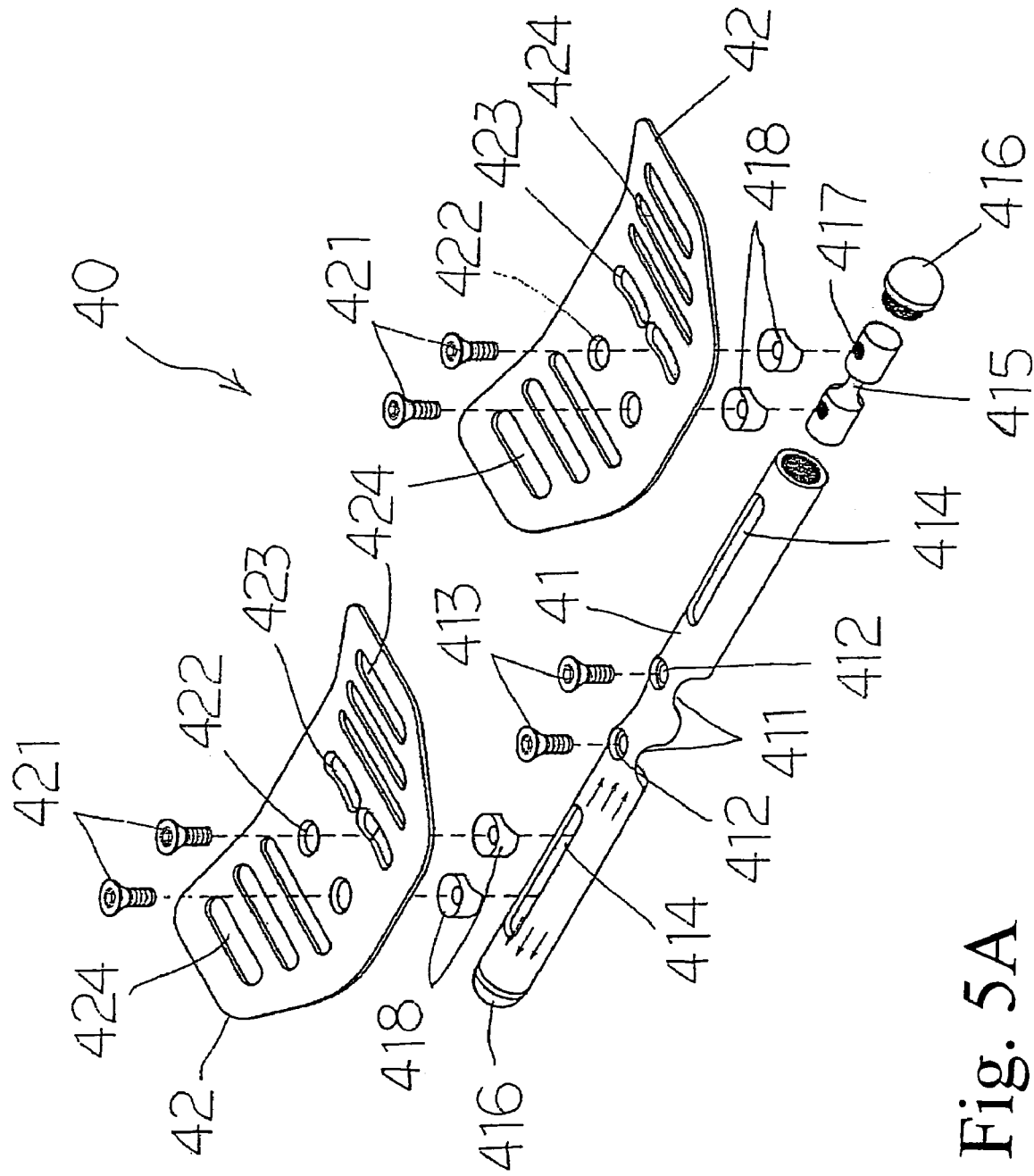
FIG. 5A is an exploded isometric view of the arm rest sub-assembly of FIG. 4.
Figure 5B:
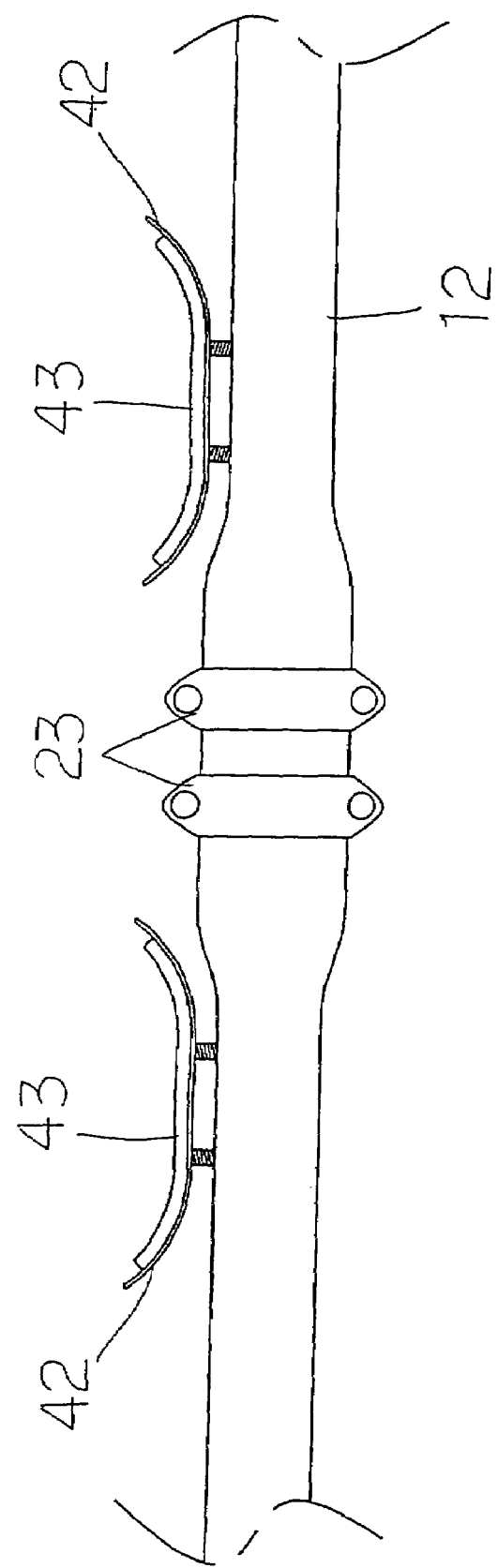
FIG. 5B is a front view of the arm rest sub-assembly of FIG. 4 after installation of the handlebars.

FIG. 1A is an isometric view of an aerobar assembly according to a preferred embodiment of the invention, and FIG. 1B is a side view. Various sub-assemblies of the aerobar assembly illustrated in FIGS. 1A and 1B are shown in FIGS. 2–8. FIG. 2 illustrates a pillar stem mount 20 and associated hardware for mounting the aerobar assembly on the handlebar stem of a bicycle, and for securing a handlebar 12 to the aerobar assembly, while FIGS. 3A–3C show a pair of aerobars 32 and a bracket 30 for adjustably mounting the aerobars on the pillar stem mount, FIGS. 4, 5A, 5B, 6, and 7 illustrate the structure and operation of an arm rest sub-assembly 40, and FIG. 8 shows one of many handlebar configurations that may be mounted to the aerobar assembly of FIG. 1.

As illustrated in FIGS. 1A, 1B, and 2, the pillar stem mount 20 is arranged to be mounted on the handlebar stem 18 of a bicycle fork by means of a cinch clamp 21. Because the handlebar stem of the bicycle fork typically has a larger diameter than the handlebars, it is better able to withstand clamping, and therefore provides a more secure mount for the aerobar assembly. Furthermore, the handlebar stem is subjected by the pillar stem to a linear, downwardly directed force that is absorbed by the frame rather than to a torsional force borne by the handlebars, eliminating the problem of metal fatigue and cracking of the handlebars.

It will be appreciated that cinch clamp 21 may be replaced by other types of structures for securing the pillar stem mount to the stem 18 of a bicycle, or the pillar stem 20 may even be made integral with the stem 18, without departing from the scope of the invention. Although not shown, the cinch clamp is typically tightened by screws or bolts extending through openings in the clamp in conventional fashion, and the clamp may rest on the frame into which the pillar stem is inserted.

The main body of the pillar stem is cylindrical and may be hollow or solid, although a hollow configuration is preferred in order to reduce the weight of the assembly. At the opposite end of pillar stem 20 from the cinch clamp 21 is an integral, generally c-shaped supporting structure 22 which has three functions: (i) to support the handlebars; (ii) to support the aerobar bracket; and (iii) to support the arm rest. The pillar stem including the supporting structure 22 at one end are preferably cast or machined as a single piece or member. Each of the handlebars, the aerobar bracket, and the arm rest assembly is independently mounted on the c-shaped supporting structure 22, and therefore independently adjustable.

The supporting structure is illustrated as including a lower pair of threaded openings 225 for mounting the aerobar bracket, an upper pair of threaded openings 224 for mounting the arm rest sub-assembly, and two pairs of frontwardly facing threaded openings 223 for mounting handlebar C-clamps or brackets 23.

Preferably, each sub-assembly is mounted using cap screws or machine screws. The illustrated screws are hex type socket head cap screws, although other types of screws or fasteners may be utilized so long as the screws or other fasteners mount the respective subassemblies to the supporting structure 22 in a secure manner and, where appropriate, in such a way that the mountings can be loosened and the positions of the subassemblies adjusted.

As illustrated in FIGS. 3A–3C, the aerobar bracket 31 preferably includes a pair of openings 311 for receiving aerobars 33 and a central connecting portion in which are located upper and lower pairs of through-holes 312, either or both pairs of which may be threaded or smooth.

Upon insertion of the aerobars to a desired position in the openings 311, the screws 313, which have been extended through openings 312 and threaded into openings 225 in the supporting structure of pillar stem 20 just far enough to avoid stressing the bracket 31, are tightened to cause the bracket to securely clamp and center the aerobars in the openings 311 by causing the lower connecting portion between the openings to be pulled toward the upper opening. To adjust the forward extent of the aerobars 32, screws 313 are simply loosed to a point at which the lower connecting portions is sufficiently far from the upper connecting portion to enable release of the aerobars for movement within the openings 32, after which the screws are tightened to the support 22 of pillar stem 21 to again clamp the aerobars.

Preferably, the bracket positions the aerobars in front of the fork, so that the fork prevents a user from extending the aerobars rearwardly to a position where the rider's knees could come into contact with the aerobars. However, those skilled in the art will appreciate that the invention is not limited to a particular aerobar configuration. For example, alternative aerobar styles are illustrated in FIGS. 3A, 3B, and 3C, the latter having a dual-curved configuration. The invention is intended to be used with any aerobar shape, length, and position.

The arm rest sub-assembly is illustrated in FIGS. 4, 5A, 5B, 6, and 7. Each of the arm plates 42 is adjustably mounted on an elongated, generally tubular or cylindrical arm plate support 41, which is mounted on the top of the pillar stem support structure 22 by two screws 413 arranged to extend through openings 412 in the support 41 and threaded openings 224 at the top of support structure 22.

Preferably, support 41 includes some sort of alignment structure arranged to fit into a complementary alignment structure in the support structure 22. For example, arm rest support 41 is illustrated as including notches or depressions 411 arranged to fit over complementary ridges or projections in the top of the support structure 22 at the end of the pillar stem 21, thereby facilitating lateral alignment of the support 41 and the support structure 22.

Arm rest support 41 includes two hollow sections in which are fitted two cylindrical, transversely-threaded dual-head nuts 415 arranged to slide axially within the support. Each of the threaded openings in each of nuts 415 is arranged to receive a cap screw 41 via slots 414 in support 41 and beveled washers 418. In addition, the cap screws received by nuts 415 respectively extend through openings 422 and 423 in the arm rest plates 42, with one of the pairs of cap screws for each nut extending through opening 422 and the other through opening 423. Openings 422 are circular while openings 423 are curved slots for reasons that will be discussed below in connection with FIG. 7.

The nuts 415 are secured within the support 41 by threaded end caps 416, which may of course take a variety of forms, including press fit rather than threaded caps.

Those skilled in the art will appreciate that nuts 415 are not limited to a dual-head shape, but may be in the form of a single cylinder with two threaded holes, or other shapes to accommodate different arm rest support configurations, including flanges or grooves to facilitate alignment of the threaded openings with the slot 414.

In addition, washers 418, which have a curved lower surface corresponding in shape to the curved surface of support 41 and a counter sink at the top to receive the heads of screws 421, may have a variety of shapes to accommodate different arm rest support and screw head shapes.

Figure 6:
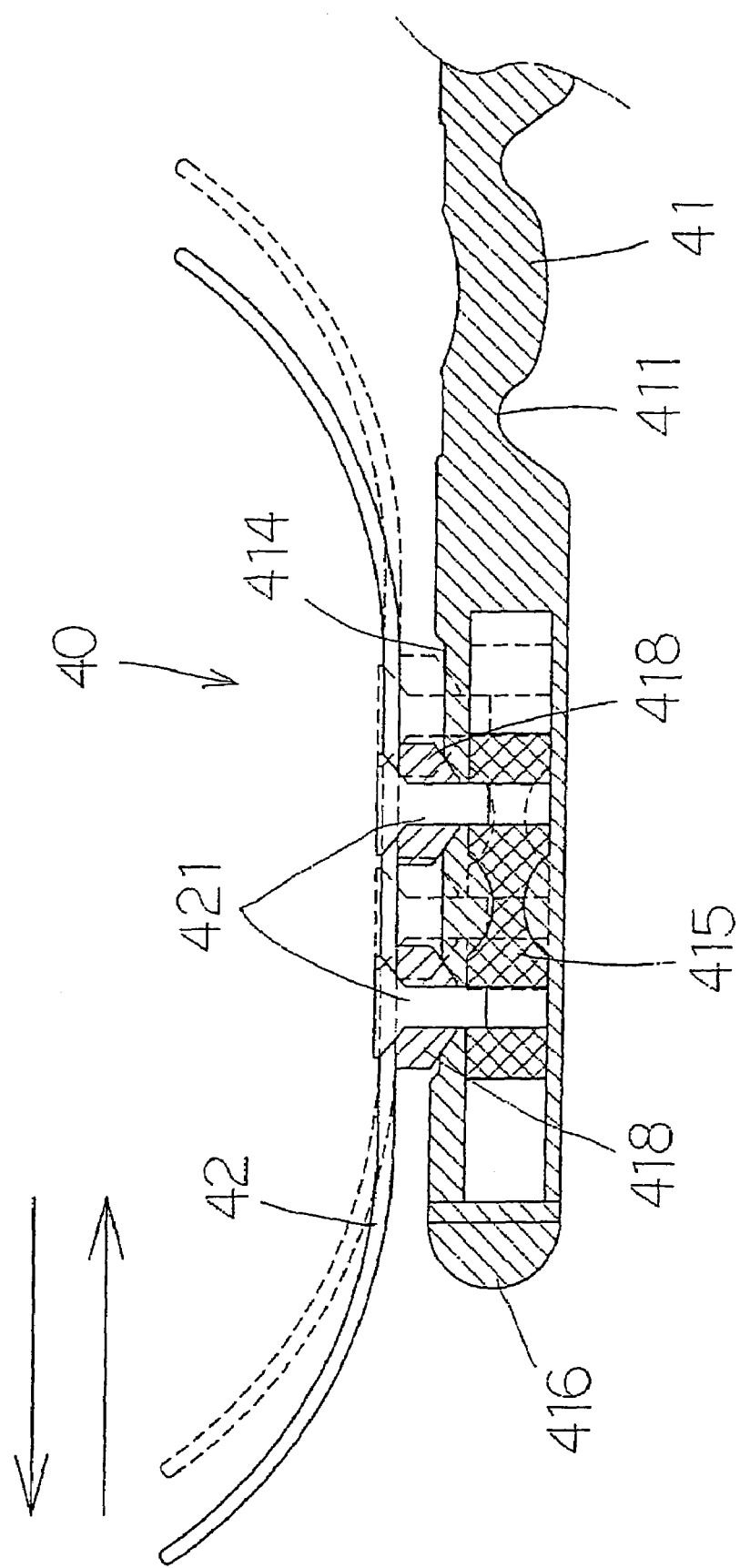
FIG. 6 is a cross-sectional front view of the arm rest sub-assembly of FIG. 4, showing lateral adjustment of the arm rests.

When the cap screws are extended through the respective openings in arm rest plates 42, washers 418, and slots 414, they may be threaded into openings 417 to fixedly secure the arm rest plates 42 to the support 414. However, as illustrated in FIG. 6, because slots 414 are longer than the distance between openings 417 in each cylindrical nut 415, as illustrated in FIG. 6, when the cap screws are loosed to permit relative movement between the nut and the support 411, but not sufficiently to separate the cap screws from the openings, the arm rest plates 42 may be slid in a direction parallel to slots 414, and thereby laterally adjusted relative to the support.

Figure 7:
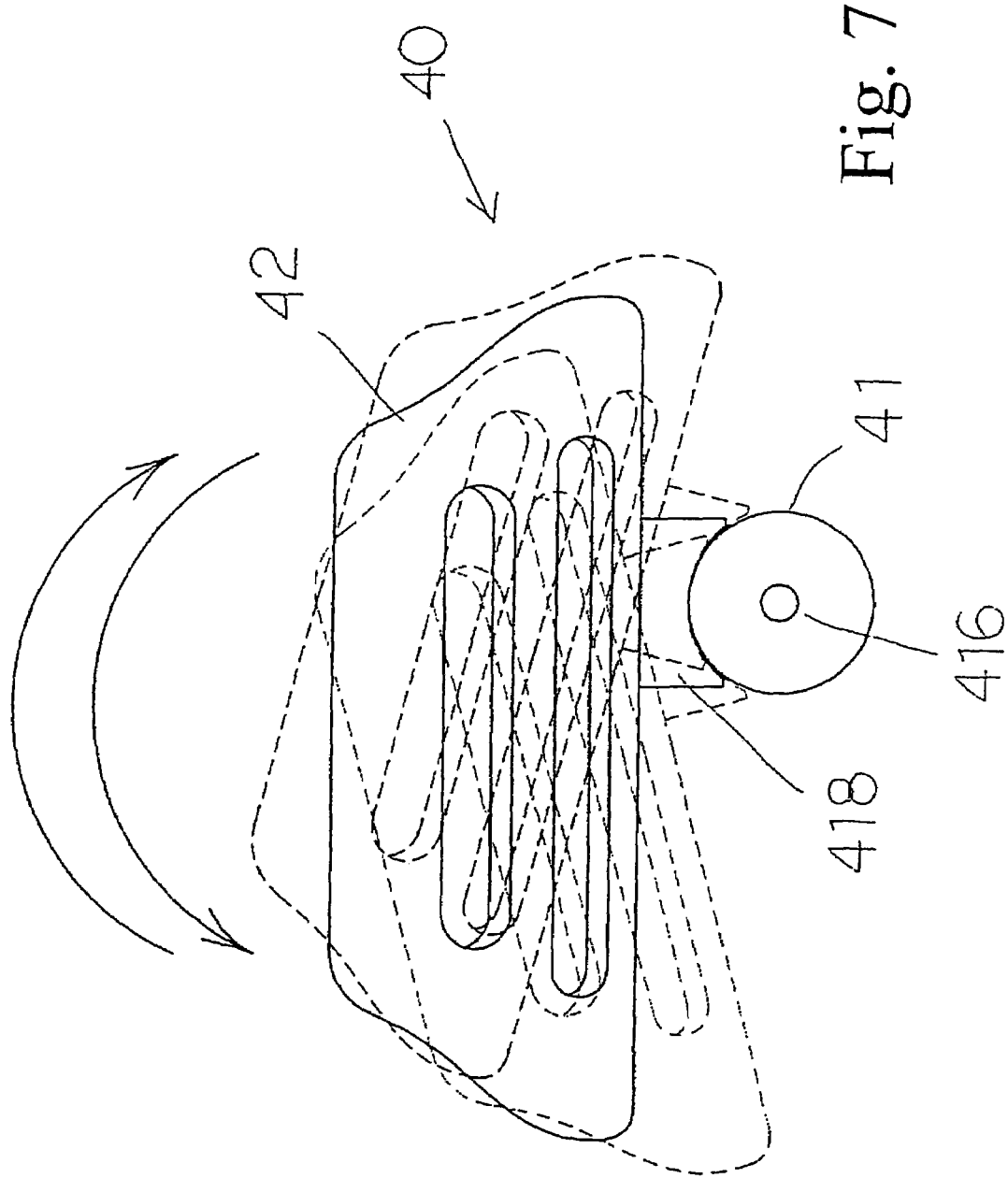
FIG. 7 is a side view of the arm rest sub-assembly of FIG. 4, showing pivotal adjustment of an arm rest about the axis of the arm rest support.
Figure 8:
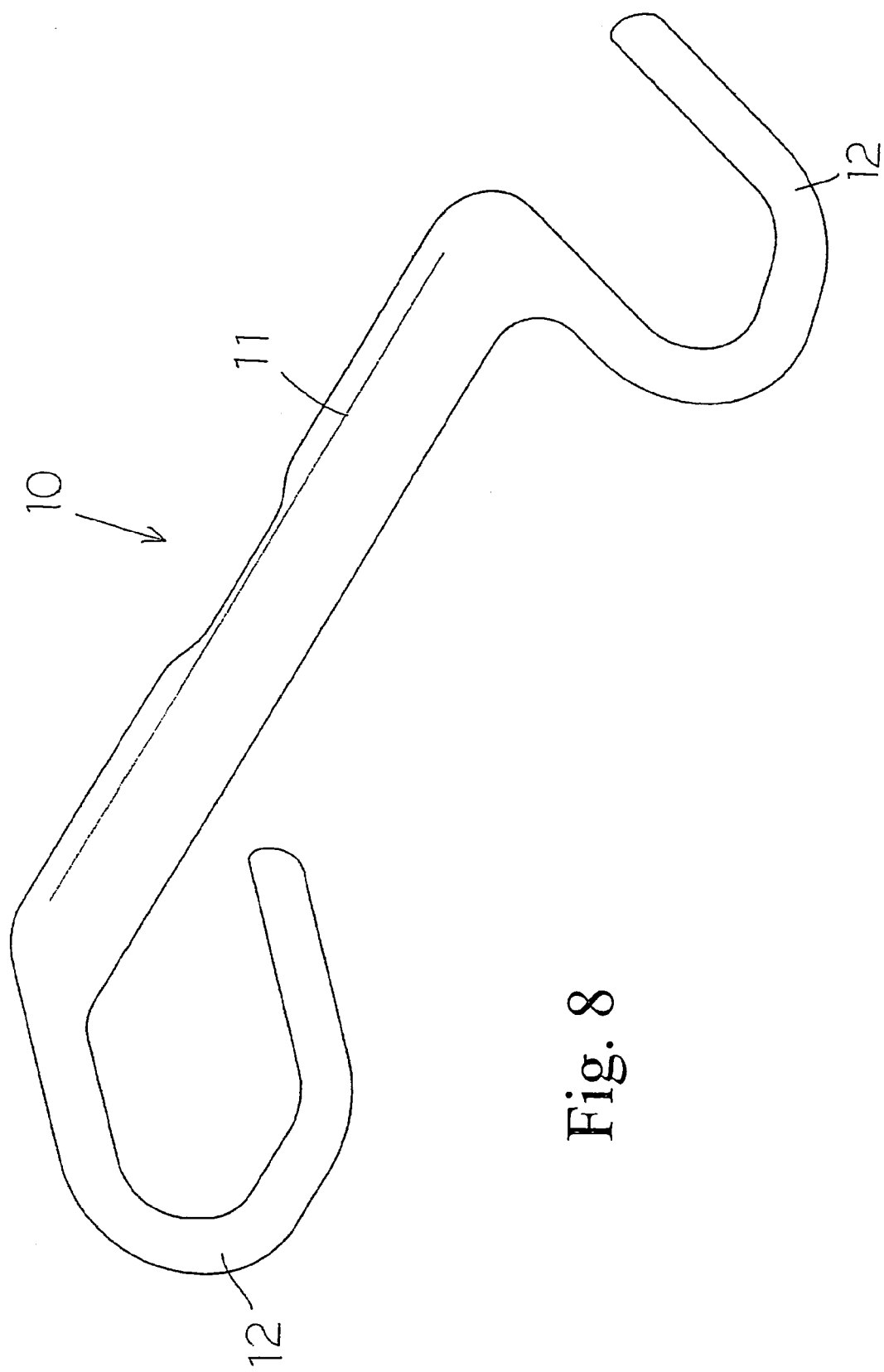
FIG. 8 is an isometric view of a handlebar that may be used with the aerobar assembly of FIG. 1.

In addition, as illustrated in FIG. 7, because the slots 411 are wide enough to permit movement of the cap screws across the width of the slots, i.e., in a tangential direction relative to support 411, and because of the curved lower surface of washers 418, when the cap screws are loosened in the manner described above, the arm rest assemblies can be swivelled or pivoted around the axis of the support so that they tilt upwardly or downwardly, or are horizontal, in accordance with the preference of the rider.

Finally, the skew or angle of the arm rest plate 42 in the horizontal plane, i.e., relative to a substantially vertical pivot, may also be adjusted, upon loosening of the cap screws by an amount sufficient to permit movement between the arm rest plates and support 411 without separating the screws from the threaded openings 417 in nuts 415, by pivoting the arm rest plates around the respective cap screws extending through openings 422, which by their circular nature providing a pivot point. Slots 423 have a curvature that forms a constant radius with the center of openings 422, and thus the slots are capable of sliding relative to the cap screws extending therethrough, allowing the entire arm plate to pivot.

As illustrated, arm rest plates include two circular openings 422 in each arm rest 42, and two slotted openings 423. This permits the fore-to-aft position of the arm rests relative to the support 411 to be adjusted by selectively using either the forwardmost or rearward most one of the slots 422 and 423 as the slots through which cap screws 421 and 422 are extended. This is an optional feature, and it is within the scope of the invention to use a single opening 422 and a single opening 423 in each arm rest plate, or more than two of each type of opening to achieve finer adjustment.

Additional optional features of the arm rest include slots 424 which reduce the weight of the plates and/or provide ventilation. The arm rest plates may be padded (not shown) for further comfort, coated with rubber, plastic, or the like, or even made of a synthetic rather than metal material. Other parts of the aerobar assembly may also be made of metal or other materials, the materials of the various parts forming no part of the present invention.

The final sub-assembly of the aerobar assembly illustrated in FIG. 1 is the handlebar sub-assembly, which consists of a handlebar 10, such as the one illustrated in FIG. 8, and C-clamps or brackets 23. The brackets each include openings 231 for cap screws 232, which are extended through the openings 231 and threaded into openings 223 to secure the handlebar to the pillar stem mount.

This arrangement permits a variety of different handlebar configurations to be used with the aerobar assembly of the invention. For example, the handlebar may correspond to handlebar 10 illustrated in FIG. 8, which is a drop style handlebar having downwardly and inwardly curved drop extensions 12 and an oval base bar 11, i.e., a base bar with an oval cross-section. Numerous other cross-sectional base bar shapes can be accommodated by the illustrated C-clamps, and if a different cross-sectional shape that does not fit the illustrated C-clamps, the C-clamps can be replaced by other clamp configurations, or by a suitably shaped or configured bracket.

Having thus described a preferred embodiment of the invention in sufficient detail to enable those skilled in the art to make and use the invention, it will be appreciated that numerous variations of the illustrated embodiment may be made without departing from the scope of the invention, such as use of different types of screws or fasteners, different arm plate configurations, different clamp configurations for the stem mount and the handlebar mount, and so forth. It is accordingly intended that the invention not be limited to the embodiment illustrated in the drawings or accompanying description, but rather that it be defined solely in accordance with the appended claims.

I claim:

1. An aerobar assembly for a bicycle, comprising:
   a pillar stem including, at a first end, a stem-securing structure for securing the pillar stem to a generally vertical stem of a bicycle and, at a second end, an integral support structure;
   an aerobar bracket sub-assembly including a bracket, aerobars adjustably secured in the bracket, and at least one aerobar bracket fastener for attaching the bracket to the support structure,
      wherein the bracket of the aerobar bracket sub-assembly includes bracket openings through which the aerobars slidably extend, and at least one transverse opening through which the at least one aerobar bracket fastener extends, the aerobar bracket fastener being arranged to be threaded into a corresponding threaded opening in the support structure, wherein tightening of the fastener in the threaded opening in the support causes the bracket to clamp the aerobars, and wherein when the fastener is loosened, the aerobars may be slid in an axial direction to provide said fore-to-aft adjustment;

an arm rest sub-assembly including an arm rest support removably secured to the support structure of the pillar stem by at least one arm rest support fastener, arm rest plates, and arm rest plate fasteners for adjustably securing the arm rest plates to the arm rest support; and handlebar clamps and handlebar clamp fasteners for removably securing a handlebar to the support structure of the pillar stem, wherein the bracket of the aerobar bracket sub-assembly, the arm rest support of the arm rest sub-assembly, and the handlebar clamps are each separately and removably attached to the support structure by said aerobar bracket fastener, said arm rest support fastener, and said handlebar clamp fasteners, respectively.

2. An aerobar assembly as claimed in claim 1, wherein the stem securing structure of the pillar clamp is a cinch clamp.

3. An aerobar assembly as claimed in claim 1, wherein the aerobar bracket fastener is a cap screw.

4. An aerobar assembly as claimed in claim 1, wherein said bracket is arranged to center said aerobars so that said aerobars are symmetrically positioned to a left and right of a center of the pillar stem.

5. An aerobar assembly as claimed in claim 1, wherein said bracket is arranged to position said aerobars in front of the vertical stem and thereby prevent the aerobars from being slid to a position where the aerobars could present a safety hazard.

6. An aerobar assembly as claimed in claim 1, wherein the arm rest support fastener is a screw that extends through the arm rest support and is threaded into the support structure.

7. An aerobar assembly as claimed in claim 1, wherein a position of said arm rest plates is arranged to be adjusted laterally by sliding said arm rest plates along said arm rest support.

8. An aerobar assembly as claimed in claim 1, wherein an angle of said arm rest plates is arranged to be adjusted in a vertical plane by swivelling the arm rest plates around the support.

9. An aerobar assembly as claimed in claim 1, wherein an angle of said arm rest plates in a horizontal plane is arranged to be adjusted by pivoting said arm rest plates around vertically extended fasteners extending through respective circular openings in said plates and threaded into a nut positioned in said arm rest support.

10. An aerobar assembly as claimed in claim 9, wherein each plate includes two said openings to enable fore-to-aft adjustment of arm rest position based on which of said two said openings receives a respective one of said fasteners.

11. An aerobar assembly as claimed in claim 1, wherein said arm rest plates are arranged to be adjusted laterally in an axial direction of said arm rest support, to be swivelled around an axis of said support, and to be pivoted about an axis transverse to said axis of said support.

12. An aerobar assembly as claimed in claim 1, wherein said handle bar assembly includes a pair of C-clamps for clamping a handlebar to a front of said support structure of said pillar stem.

13. An aerobar assembly as claimed in claim 12, wherein said handlebar clamp fasteners include screws, and said C-clamps are secured to said pillar stem by said screws extending through said C-clamps and threaded into said pillar stem.

14. An aerobar assembly for a bicycle, comprising:

a pillar stem including, at a first end, a stem-securing structure for securing the pillar stem to a generally vertical stem of a bicycle and, at a second end, an integral support structure;

an aerobar bracket sub-assembly including a bracket and aerobars advisably secured in the bracket, and at least one aerobar bracket fastener for attaching the bracket to the support structure;

an arm rest sub-assembly including an arm rest support removably secured to the support structure of the pillar stem by at least one arm rest support fastener, arm rest plates, and arm rest plate fasteners for adjustably securing the arm rest plates to the support structure, wherein the arm rest support includes two hollow cylindrical sections arranged to slidably receive respective cylindrical nuts, each including at least one internally threaded opening extending into the nuts in a direction traverse to respective cylinder axes of the nuts, said internally threaded opening being arranged to receive, via axially extending slots in the support, arm rest plate fasteners arranged to fasten arm rest plates to the arm rest support, wherein when said arm rest plate fasteners are tightened, said arm rest plates are fixed to the arm rest support, and wherein when said arm rest plate fasteners are loosed, said arm rest plates, fasteners, and nuts may be slid in an axial direction of said arm rest support; and handlebar clamps and handlebar clamp fasteners for removably securing a handlebar to the support structure of the pillar stem, wherein the bracket of the aerobar bracket sub-assembly, the arm rest support of the arm rest sub-assembly, and the handlebar clamps are each separately and removably attached to the support structure by said aerobar bracket fastener, said arm rest support fastener, and said handlebar clamp fasteners, respectively.

15. An aerobar assembly as claimed in claim 14, wherein said axially extending slots are sufficiently wide to permit swivelling of said arm rest plates, fasteners, and cylindrical nuts about an axis of said arm rest support.

16. An aerobar assembly as claimed in claim 14, wherein a number of said internally threaded openings in each of said cylindrical nuts is two, and a number of said arm rest plate fasteners is also two, said arm rest plate being arranged to pivot about one of said arm rest plate fasteners.

17. An aerobar assembly as claimed in claim 14, wherein said arm rest plates each include a circular opening and a curved slotted opening for respectively receiving a pair of fasteners, wherein said arm rest plates can each be pivoted about one of said fasteners to provide adjustment of respective angular positions of said arm rest plates about a substantially vertical axis.

18. An aerobar assembly as claimed in claim 17, wherein each of said arm rest plates includes at least two said circular openings and two said curved slotted openings, wherein said fasteners may be extended through either of said circular openings and either of said curved slotted openings to further adjust a position of said arm rest plates.

19. An aerobar assembly as claimed in claim 14, wherein said handle bar clamps include a pair of C-clamps for clamping said handlebar to a front of said support structure of said pillar stem.

20. An aerobar assembly as claimed in claim 19, wherein said handlebar clamp fasteners include screws, and said C-clamps are secured to said pillar stem by said screws extending through said C-clamps and threaded into said pillar stem.

* * * * *